(12) United States Patent
Ahn (10) Patent No.: US 8,751,124 B2
(45) Date of Patent: Jun. 10, 2014

(54) METHOD AND SYSTEM FOR ADAPTIVE ELECTRONIC DRIVEFORCE UNIT CONTROL

(75) Inventor: Samuel S. Ahn, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 616 days.

(21) Appl. No.: 12/716,164

(22) Filed: Mar. 2, 2010

(65) Prior Publication Data

US 2011/0218722 A1 Sep. 8, 2011

(51) Int. Cl.
  *G06F 7/70* (2006.01)
  *G06F 19/00* (2011.01)
  *G06G 7/00* (2006.01)
  *G06G 7/76* (2006.01)

(52) U.S. Cl.
  USPC .......................................................... 701/70

(58) Field of Classification Search
  None
  See application file for complete search history.

(56) References Cited

U.S. PATENT DOCUMENTS

| | | |
|---|---|---|
| 3,665,779 A | 5/1972 | Mori |
| 4,164,876 A | 8/1979 | Peppel |
| 4,254,998 A | 3/1981 | Marshall et al. |
| 4,592,565 A | 6/1986 | Eagle |
| 4,598,611 A | 7/1986 | Frank |
| 4,601,680 A | 7/1986 | Tokoro et al. |
| 4,841,815 A | 6/1989 | Takahashi |
| 4,884,648 A | 12/1989 | Uchida et al. |
| 4,958,695 A | 9/1990 | Uchida et al. |
| 5,099,720 A | 3/1992 | Raue |
| 5,233,523 A | 8/1993 | Follmer |
| 5,413,541 A | 5/1995 | Nasset |
| 5,444,307 A | 8/1995 | Sheets et al. |
| 5,459,658 A | 10/1995 | Morey et al. |
| 5,717,592 A | 2/1998 | Oo et al. |
| 5,857,937 A | 1/1999 | Ashizawa et al. |
| 5,913,916 A | 6/1999 | Bai et al. |
| 5,957,255 A | 9/1999 | Grytzelius |
| 6,042,196 A | 3/2000 | Nakamura et al. |
| 6,067,493 A | 5/2000 | Adachi et al. |

(Continued)

FOREIGN PATENT DOCUMENTS

| | | |
|---|---|---|
| EP | 425276 | 10/1990 |
| JP | 09-042444 | 2/1900 |

(Continued)

OTHER PUBLICATIONS

RD 323100, Mar. 10, 1991.

*Primary Examiner* — Paul Danneman
(74) *Attorney, Agent, or Firm* — Snell & Wilmer LLP (57) ABSTRACT

The present invention is a method and system for adaptive electronic driveforce unit control based on the weather. An automobile can include, for example a driveforce system. The driveforce system can include a driveforce unit, an acceleration input device, a memory, a speed sensor, and/or a weather detection system. The acceleration input device can generate acceleration input data. The driveforce unit can generate an output based on the corresponding acceleration input data from a driveforce curve in a driveforce map. The driveforce map can be stored in the memory. The speed sensor can detect speed data indicating a speed and/or acceleration of the automobile. The weather detection system includes a moisture detection system detecting moisture data, a temperature sensor detecting temperature data, and a windshield wiper detection system detecting windshield wiper data. The processor adjusts the driveforce curve in the driveforce map based on the weather data.

20 Claims, 5 Drawing Sheets

(56) References Cited

U.S. PATENT DOCUMENTS

| | | |
|---|---|---|
| 6,076,622 A | 6/2000 | Chakraborty |
| 6,128,565 A | 10/2000 | Tsutsui et al. |
| 6,205,387 B1 | 3/2001 | Ochiai |
| 6,440,037 B2 | 8/2002 | Takagi et al. |
| 6,442,467 B1 | 8/2002 | Schuler et al. |
| 6,461,261 B2 | 10/2002 | Yamamoto et al. |
| 6,466,851 B2 | 10/2002 | Kato et al. |
| 6,478,713 B1 | 11/2002 | Runde et al. |
| 6,496,771 B2 | 12/2002 | Hattori et al. |
| 6,516,260 B2 | 2/2003 | Wetzel et al. |
| 6,516,664 B2 | 2/2003 | Lynam |
| 6,523,911 B1 | 2/2003 | Rupp et al. |
| 6,524,216 B2 | 2/2003 | Suzuki et al. |
| 6,584,391 B2 | 6/2003 | Lack |
| 6,662,098 B2 | 12/2003 | Hellmann et al. |
| 6,668,225 B2 | 12/2003 | Oh et al. |
| 6,726,594 B2 | 4/2004 | Mizuno et al. |
| 6,821,228 B2 | 11/2004 | Aoki et al. |
| 6,823,250 B2 | 11/2004 | Yamaguchi et al. |
| 6,957,139 B2 | 10/2005 | Bellinger |
| 6,968,736 B2 | 11/2005 | Lynam |
| 6,995,663 B2 | 2/2006 | Geisler et al. |
| 7,113,860 B2 | 9/2006 | Wang |
| 7,139,650 B2 | 11/2006 | Lubischer |
| 7,177,743 B2 | 2/2007 | Roy |
| 7,226,134 B2 | 6/2007 | Horn et al. |
| 7,272,481 B2 | 9/2007 | Einig et al. |
| 7,302,332 B2 | 11/2007 | Nenninger |
| 7,303,505 B2 | 12/2007 | Kanafani et al. |
| 7,392,120 B2 | 6/2008 | Matsumoto et al. |
| 7,393,305 B2 | 7/2008 | Yamada et al. |
| 7,447,583 B2 | 11/2008 | Ogawa |
| 7,548,810 B2 | 6/2009 | Aoki |
| 7,568,996 B2 | 8/2009 | Matsui et al. |
| 7,582,041 B2 | 9/2009 | Suzuki et al. |
| 2005/0049772 A1 | 3/2005 | Liu |
| 2005/0051133 A1 | 3/2005 | Persson et al. |
| 2005/0259033 A1* | 11/2005 | Levine ................. 345/7 |
| 2006/0041355 A1 | 2/2006 | Blundell et al. |
| 2006/0261980 A1 | 11/2006 | Beier |
| 2007/0061061 A1* | 3/2007 | Salman et al. ............. 701/80 |
| 2007/0260385 A1 | 11/2007 | Tandy, Jr. et al. |
| 2007/0266700 A1 | 11/2007 | Lang et al. |
| 2008/0027613 A1 | 1/2008 | Bai et al. |
| 2008/0032858 A1 | 2/2008 | Frank et al. |
| 2008/0036296 A1 | 2/2008 | Wu et al. |
| 2008/0147277 A1 | 6/2008 | Lu et al. |
| 2008/0172163 A1 | 7/2008 | Englert et al. |
| 2008/0312030 A1 | 12/2008 | Kurita et al. |
| 2009/0018736 A1 | 1/2009 | Kuwahara |
| 2009/0043468 A1 | 2/2009 | Kondo et al. |
| 2009/0072997 A1 | 3/2009 | Shrum, Jr. |
| 2009/0088938 A1 | 4/2009 | Usukura |
| 2009/0093936 A1 | 4/2009 | Lindgren et al. |
| 2009/0118095 A1 | 5/2009 | Tabata et al. |
| 2009/0157269 A1 | 6/2009 | Matsubara et al. |
| 2009/0219394 A1 | 9/2009 | Heslin et al. |
| 2009/0236159 A1 | 9/2009 | Shibata et al. |
| 2009/0240405 A1 | 9/2009 | Tawara |
| 2009/0250278 A1 | 10/2009 | Kawasaki et al. |

FOREIGN PATENT DOCUMENTS

| | | |
|---|---|---|
| JP | 2-71163 | 5/1990 |
| JP | 06-270713 | 9/1994 |
| JP | 2000-043705 | 2/2000 |
| JP | 2000-272381 | 10/2000 |
| JP | 2001088683 | 4/2001 |
| JP | 2001-235016 | 8/2001 |

* cited by examiner

METHOD AND SYSTEM FOR ADAPTIVE ELECTRONIC DRIVEFORCE UNIT CONTROL

BACKGROUND

1. Field

The present invention relates to a method and system for adaptive electronic driveforce unit control, and more specifically to a method and system for adaptive electronic driveforce unit control based on the weather.

2. Description of the Related Art

Generally, conventional automobiles include a driveforce unit which delivers the same amount of output for a corresponding depression of the accelerator pedal regardless of the ambient conditions of the automobile. However, in certain conditions such as with inclement weather, there may be low traction conditions. The low traction conditions combined with the conventional amount of output can cause, for example, tires in the automobile to lose traction and spin rapidly when the accelerator pedal is depressed. This can cause the automobile to move at inadequate speeds or present the automobile from moving from an immobile position.

Thus, there is a need for a method and system for adaptive electronic driveforce unit control based on outdoor conditions.

SUMMARY

The present invention is a method and system for adaptive electronic driveforce unit control based on outdoor conditions (e.g., the weather). An automobile can include, for example a driveforce system. The driveforce system can include, for example, a driveforce unit, an acceleration input device, a memory, a speed sensor, and/or a weather detection system. The acceleration input device can generate acceleration input data indicating a percent application of the acceleration input device.

The driveforce unit can generate an output, such as torque, based on a corresponding acceleration input data from the acceleration input device based on a driveforce curve in a driveforce map. The driveforce map can be stored, for example, in the memory. The speed sensor can detect speed data indicating a speed and/or an acceleration of the automobile. The weather detection system detects and includes, for example, a moisture detection system detecting moisture data, a temperature sensor detecting temperature data, and a windshield wiper detection system detecting windshield wiper data.

The processor can adjust the driveforce curve in the driveforce map based on the weather data. Thus, when the weather data indicates inclement weather, the processor can decrease the driveforce curve. The inclement weather can indicate, for example, low-traction conditions. By decreasing the driveforce curve, a particular percent application of the acceleration input device will result in a lower output from the driveforce unit. This can reduce a likelihood of the automobile losing traction due to low traction conditions.

In one embodiment, the present invention is a driveforce system including a weather detection system for detecting weather data, a memory for storing a driveforce map, and a processor connected to the weather detection system and the memory, the processor configured to analyze the weather data and adjust the driveforce map based on the weather data.

In another embodiment, the present invention is an automobile including a weather detection system detecting weather data, an acceleration input device for detecting acceleration input data, a driveforce unit connected to the processor and for generating an output, a memory for storing a driveforce map including a driveforce curve indicating the output of the driveforce unit for a corresponding acceleration input data, and a processor connected to the weather detection system and the memory, the processor configured to analyze the weather data, and adjust the driveforce curve based on the weather data.

In yet another embodiment, the present invention is a method for varying an amount of driveforce including determining weather data, analyzing the weather data, storing a driveforce map, adjusting the driveforce map based on the weather data, and adjusting a driveforce curve in the driveforce map by an amount based on the weather data.

BRIEF DESCRIPTION OF THE DRAWINGS

The features and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
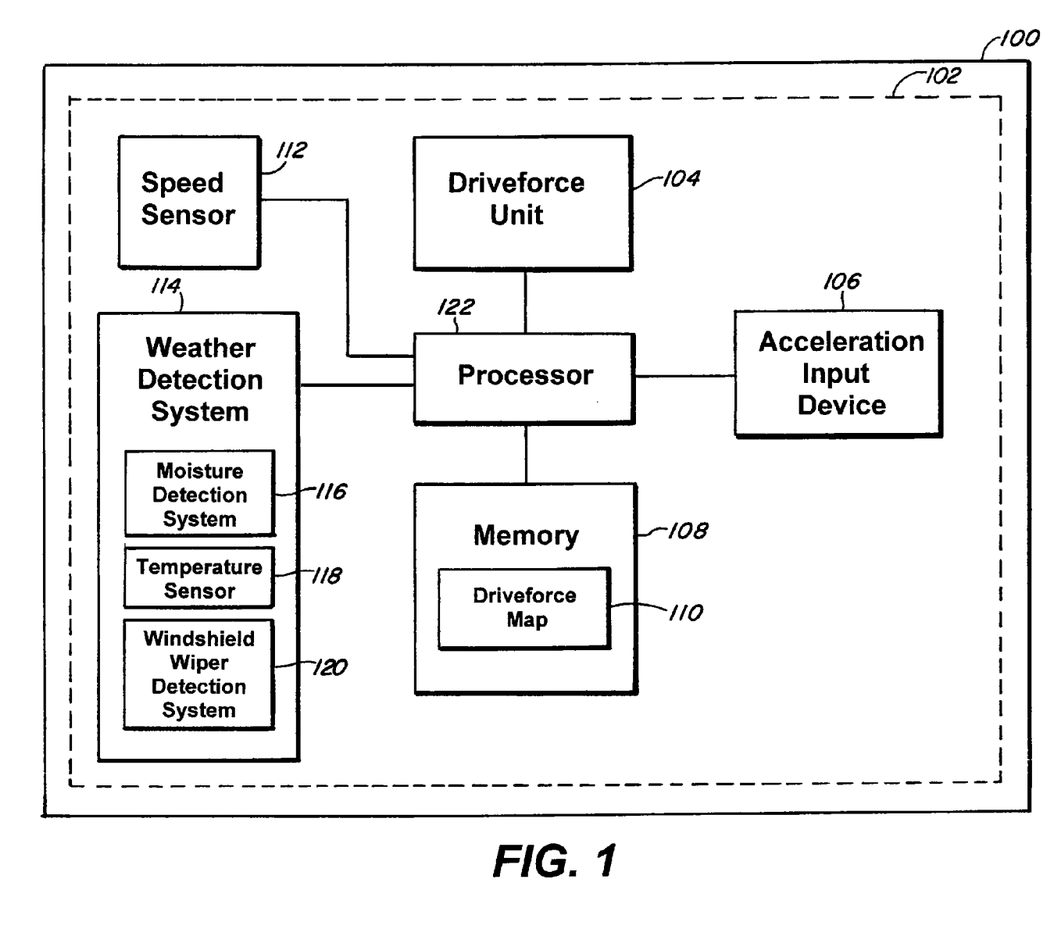
FIG. 1 is a box diagram of an automobile including a driveforce system according to an embodiment of the present invention.

In one embodiment, the present invention includes an automobile 100. The automobile 100 includes a driveforce system 102. The automobile 100 can be, for example, an electric vehicle, a hybrid vehicle, a vehicle with a combustion engine, or any other type of vehicle which can transport a user. The driveforce system 102 includes, for example, a driveforce unit 104, an acceleration input device 106, a memory 108, a speed sensor 112, a weather detection system 114, and/or a processor 122.

The acceleration input device 106 is connected, for example, to a processor 122. The acceleration input device 106 can generate, for example, acceleration input data. The acceleration input device 106 can be, for example, an acceleration pedal. The acceleration input data can indicate, for example, a percent depression of the acceleration input device 106.

The driveforce unit 104 is connected, for example, to a processor 122. The driveforce unit 104 can be, for example, a throttle with a variable throttle opening. The driveforce unit 104 can generate, for example, an output that can be varied. The output of the driveforce unit 104 can correspond, for example, to the acceleration input data. The output of the driveforce unit 104 can be determined, for example, by a driveforce curve in a driveforce map 110, which will be disclosed below. The output of the driveforce unit 104 can determine, for example, an amount of torque supplied to the automobile 100.

Figure 2:
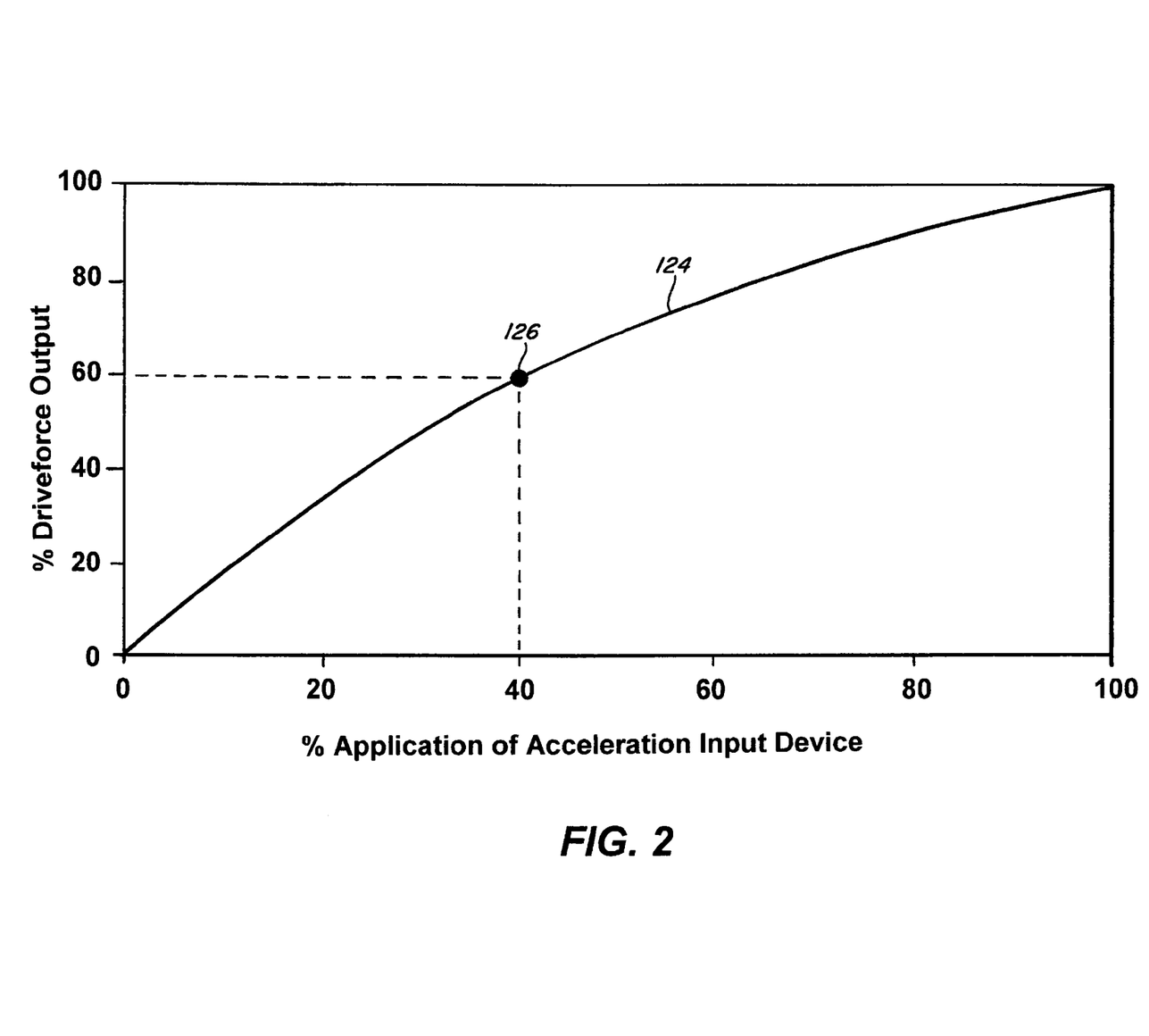
FIG. 2 depicts a driveforce map including a driveforce curve according to an embodiment of the present invention.

The memory 108 is connected to the processor 122 and stores, for example, a driveforce map 110. The driveforce map 110 can be seen, for example, in FIG. 2. The driveforce map 110 includes a driveforce curve 124. The driveforce curve 124 indicates an output of the driveforce unit 104 based on the percent application of the acceleration input device 106. As can be seen by point 126, a 40% application of the acceleration input device 106 results in a 60% output of the driveforce unit 104.

The speed sensor 112 is connected to the processor 122. The speed sensor 112 detects, for example, speed data indicating a speed of the automobile 100. The speed data can be transmitted to the processor 122. The speed data can also be used, for example, to determine an acceleration of the automobile 100.

The weather detection system 114 is connected to the processor 122. The weather detection system 114 can detect, for example, weather data indicating a weather around the automobile 100. The weather detection system 114 can include, for example, a moisture detection system 116, a temperature sensor 118, and/or a windshield wiper detection system 120. The moisture detection system 116 can detect, for example, moisture data such as an amount of moisture and a type of moisture around the automobile 100. For example, the moisture detection system 116 can detect whether there is rain or snow around the automobile 100, whether there is rain or snow on the road that the automobile 100 is on, whether it is actually raining or snowing, the amount it is raining or snowing, and/or an amount of rain or snow on the road that the automobile 100 is in. Furthermore, the moisture detection system 116 can also detect the same type of data regarding ice.

The temperature sensor 118 can detect temperature data, such as a temperature of the area around the automobile. For example, the temperature data can indicate an outside temperature of the area around the automobile 100, and/or an inside temperature of the automobile 100. The windshield wiper detection system 120 can detect windshield wiper data such as whether a windshield wiper on the automobile 100 is active or on, whether the windshield wiper is inactive or off, a speed of the windshield wiper, a time period that the windshield wiper is active or on, and/or a time period that the windshield wiper is active or off.

The activation and speed of the windshield wiper can be, for example, an indication of the weather at the location of the automobile 100 since the windshield wiper is usually only active when there is inclement weather. In one embodiment, the weather data can include, for example, moisture data, temperature data, and/or windshield wiper data.

The processor 122 can be connected to the driveforce unit 104, the acceleration input device 106, the speed sensor 112, and/or the weather detection system 114. The processor 122 receives the acceleration input data from the acceleration input device 106 and determines the output of the driveforce unit 104 based on the driveforce map 110 in the memory 108. The processor 122 can also, for example, adjust the driveforce curve based on the weather data, such as the moisture data, the temperature data, and/or the windshield wiper data such that the acceleration input data indicating a same percentage application of the application input device 106 results in a different output of the driveforce unit 104 in an adjusted driveforce curve compared to the output of the driveforce unit 104 in an original driveforce curve.

Figure 3:
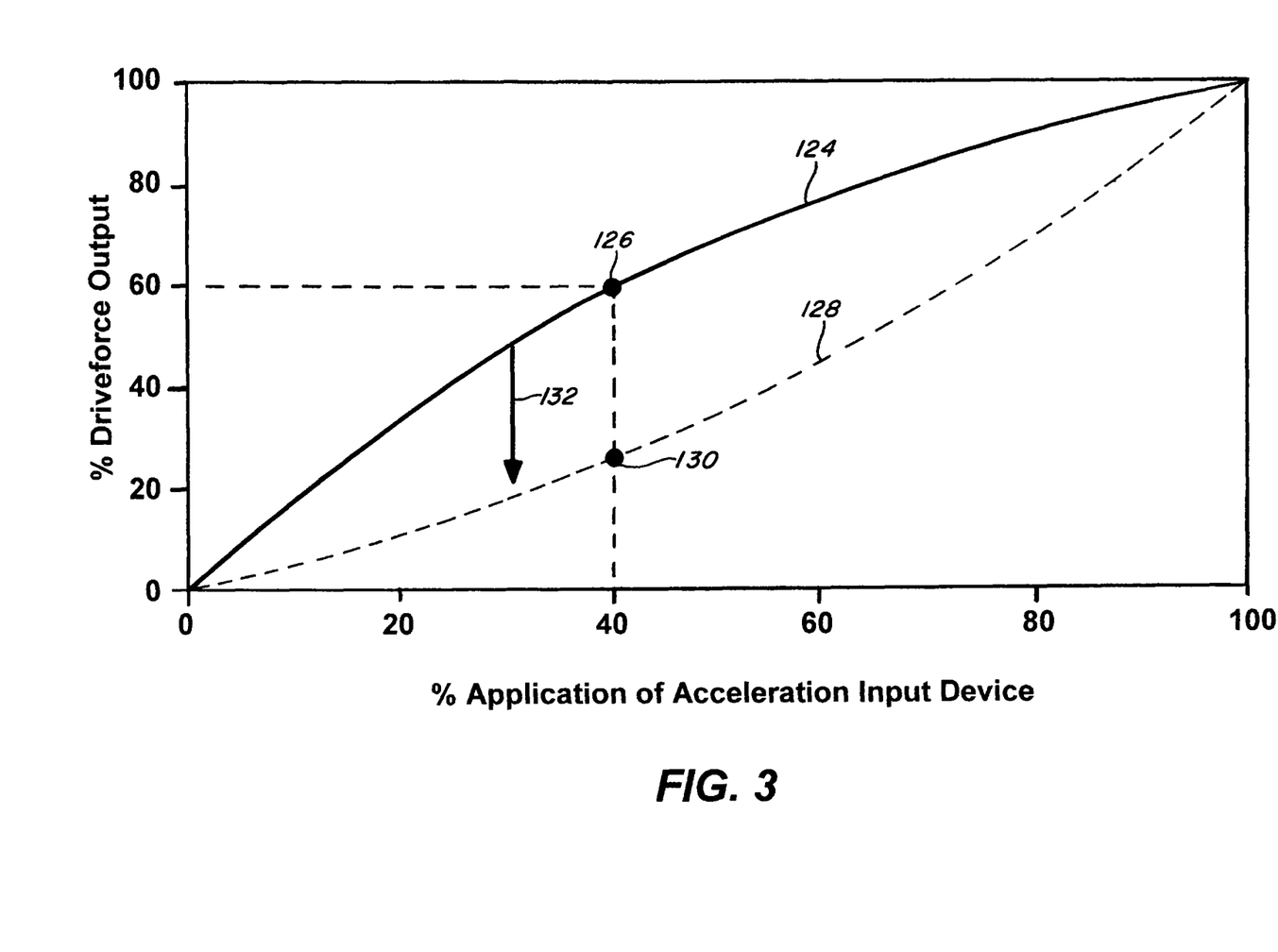
FIG. 3 depicts a driveforce map including an adjusted driveforce curve according to an embodiment of the present invention.

For example, in FIG. 3, the driveforce curve 124 is decreased to be a driveforce curve 128 as indicated by arrow 132. In the driveforce curve 128, a 40% application of the acceleration input device 106 now results in approximately a 25% output of the driveforce unit as indicated by the point 130. Thus, instead of a 60% output of the driveforce unit 104, the output of the driveforce unit 104 is now 25% after the driveforce curve 124 is modified to be the driveforce curve 128 by the processor 122. The processor 122 can dynamically modify the driveforce curve 128 based on the weather data, such as when the weather data indicates that traction can be increased when the driveforce curve is modified.

Thus, the processor 122 can determine if there is inclement weather and/or if the road is likely to be wet or icy based on the weather data. During inclement weather and/or if the road is likely to be wet or icy, a traction of the automobile 100 can be reduced. If such a condition is determined based on the weather data, the processor 122 can decrease the driveforce curve 128 in the driveforce map 110. By decreasing the driveforce curve 128 in the driveforce map 110, the output of the driveforce unit 104 is decreased. This can decrease an amount of the torque supplied to the automobile 100, which can reduce the likelihood of the automobile 100 losing traction. This allows the automobile 100 to move from its current position if it is stationary and/or prevent the automobile 100 from having a reduced ability to turn the automobile 100.

Although the above example describes the driveforce curve being decreased, the decrease of the driveforce curve need not be uniform. For example, portions of the driveforce curve can be decreased by a greater amount than other portions of the driveforce curve. In addition, the driveforce curve can be only partially decreased. In one embodiment, the driveforce curve can be partially decreased, and partially increased.

In another embodiment, the decrease in the driveforce curve can be based on, for example, a type of moisture and/or an amount of moisture. For example, if there is a large amount of moisture such as rain, snow, or ice, the driveforce curve can be decreased by a larger amount than if there is a small amount of moisture. Furthermore, if the road is icy, the driveforce curve may be decreased by a larger amount than if the road is wet.

The determination of the type of moisture and/or an amount of moisture can be based upon the moisture data, the windshield wiper data, and/or the temperature data. For example, the moisture detection system 116 can detect the type of moisture and/or the amount of moisture. In addition, when the temperature falls below a predetermined temperature threshold, such as freezing temperature or approximately 32° F., there may be a greater likelihood of ice or snow. Furthermore, when the windshield wiper data indicates that the windshield wiper is active for longer than a predetermined windshield wiper on time period and/or moving rapidly, there may be a large amount of moisture.

Figure 4:
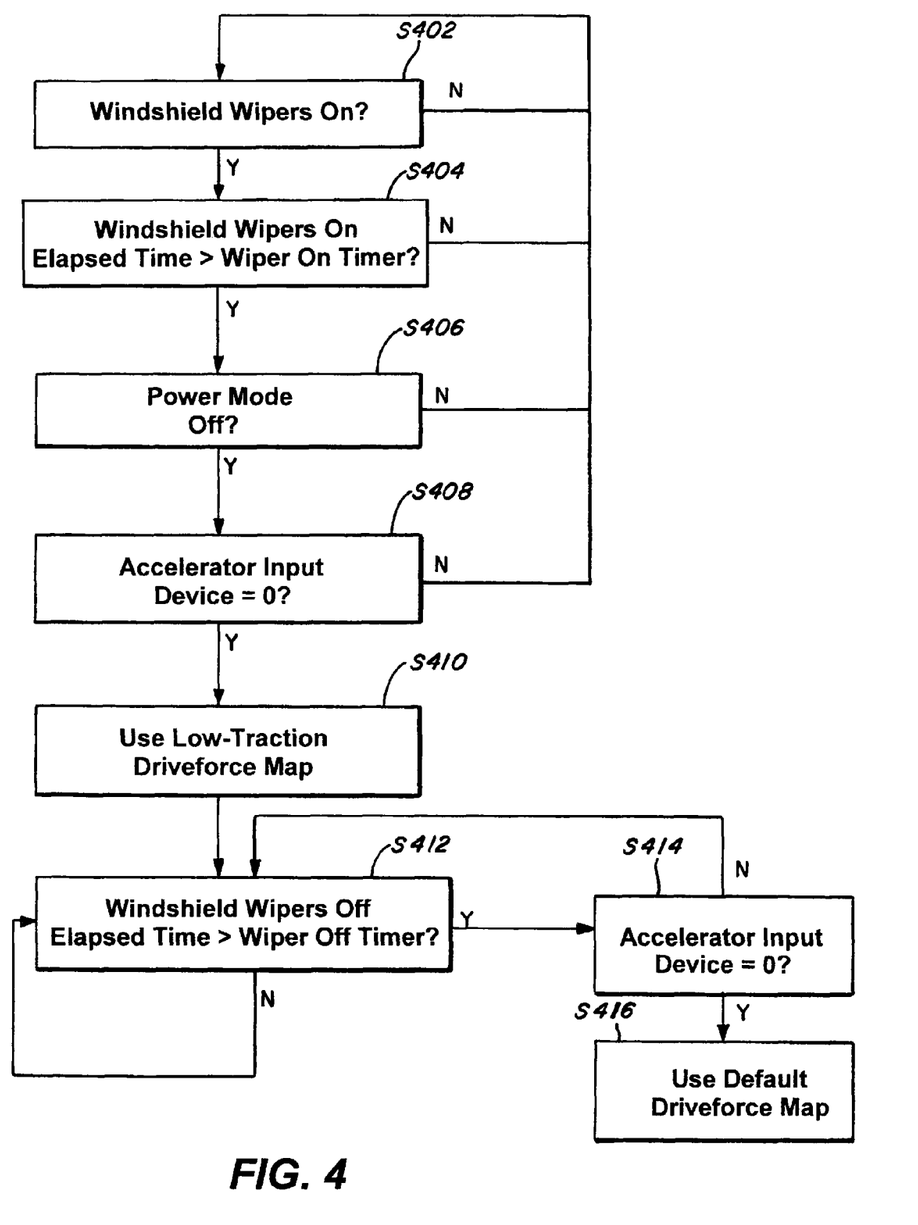
FIG. 4 depicts a process according to an embodiment of the present invention.

In one embodiment, the present invention is a process shown in FIG. 4. In Step S402, a detection of whether the windshield wipers are on is made. For example, the windshield wiper detection system 120 in the weather detection system 114 can detect whether the windshield wipers of the automobile 100 are on. If the windshield wipers of the automobile 100 are not on, Step S402 is repeated.

Otherwise, in Step S404, a determination is made as to whether the windshield wipers are on for a longer time than a wiper on timer. For example, the weather detection system 114 can detect an amount of time that the windshield wipers were activated in the windshield wiper data. The processor 122 can analyze the windshield wiper data to determine whether the elapsed time is greater than a predetermined windshield wiper on time period. If the windshield wipers are not active for a greater time than the predetermined windshield wiper on time period, Step S402 is repeated.

Otherwise, in Step S406, a determination is made to whether a power mode is off. The power mode can, for example, be a user indication that more torque should be supplied. If the power mode is not off, such as when the user has indicated that more torque should be supplied, then the driveforce curve should not be further adjusted. If the power mode is not off, then Step S402 is repeated.

Otherwise, in Step S408, a determination is made as to whether the acceleration input device indicates an acceleration input data of 0. If the acceleration input data is 0, then the acceleration input device is not depressed by the user. If the acceleration input device does not indicate an acceleration input data of 0, then Step S402 is repeated. For example, in one embodiment, the driveforce map 110 can be switched only when the automobile 100 is not moving, or when the automobile 100 is moving below a predetermined speed. The predetermined speed can be, for example 5 mph. Otherwise, in Step S410, a low-traction driveforce map is used. For example, a driveforce map with an adjusted driveforce curve adapted for low-traction conditions can be used.

In Step S412, a determination is made to determine whether the windshield wipers are off for a longer time than a wiper off timer. For example, the weather detection system 114 can detect an amount of time that the windshield wipers are off in the windshield wiper data. The processor 122 can analyze the windshield wiper data to determine whether the elapsed time is greater than a predetermined windshield wiper off time period. If the windshield wipers are not off for a greater time than the predetermined windshield wiper off time period, Step S412 is repeated.

Otherwise, in Step S414, a determination is made as to whether the acceleration input device indicates an acceleration input data of 0. If the acceleration input device does not indicate an acceleration input data of 0, then Step S412 is repeated. Otherwise, in Step S416, a default driveforce map is used. For example, instead of using the adjusted driveforce curve adapted for low-traction conditions, a default driveforce curve in a default driveforce map can be used.

Figure 5:
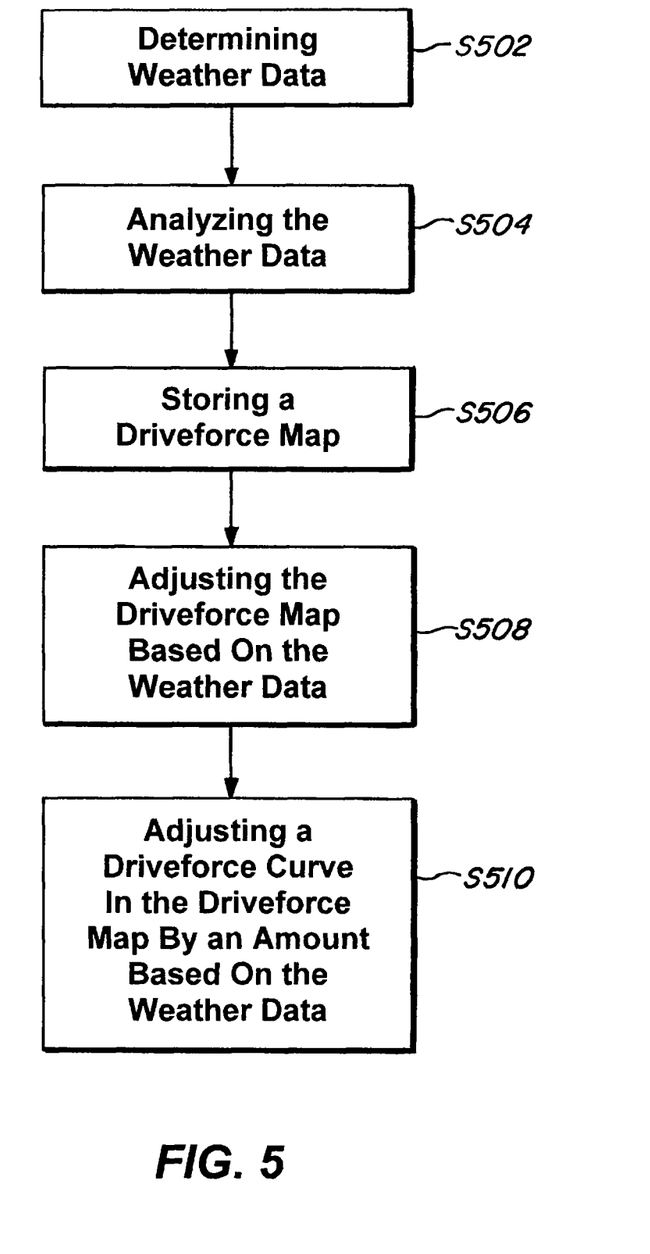
FIG. 5 depicts a process according to an embodiment of the present invention.

In another embodiment the present invention is a process as shown in FIG. 5. In Step S502, weather data can be determined. For example, the weather detection system 114 can detect weather data. The moisture detection system 116 can detect moisture data, the temperature sensor 118 can detect temperature data, and the windshield wiper detection system 120 can detect windshield wiper data. In Step S504, the weather data is analyzed. For example, the processor 122 can analyze the weather data such as the moisture data, the temperature data, and/or the windshield wiper data.

In Step S508, the driveforce map is adjusted based on the weather data. For example, the processor 122 can adjust the driveforce map 110 based on the weather data. In Step S510, a driveforce curve in the driveforce map is adjusted by an amount based on the weather data. For example, the processor 122 can adjust a driveforce curve in the driveforce map 110 by an amount based on the weather data.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A driveforce system comprising:
a weather detection unit having at least one sensor for detecting weather data;
a memory for storing a driveforce map;
an acceleration input device having an active state and an idle state; and
a processor connected to the weather detection unit, the acceleration input device, and the memory, the processor configured to analyze the weather data and determine an adjustment to the driveforce map based on the weather data, wherein the processor is configured to wait for the acceleration input device to be in the idle state before applying the adjustment to the driveforce map.

2. The system of claim 1 wherein
the acceleration input device is configured to detect acceleration input data and further comprising
a driveforce unit connected to the processor, wherein an output of the driveforce unit is varied by the processor.

3. The system of claim 2 wherein the driveforce map includes a driveforce curve for indicating the output of the driveforce unit for a corresponding acceleration input data.

4. The system of claim 3 wherein the weather detection unit includes a moisture detection sensor and the weather data includes moisture data, and the processor is configured to decrease the driveforce curve by an amount based on an amount of moisture and a type of moisture indicated by the moisture data.

5. The system of claim 4 wherein the weather detection unit further includes a temperature sensor and the weather data includes temperature data, and the processor is configured to decrease the driveforce curve by an amount based on a temperature indicated by the temperature data.

6. The system of claim 5 wherein the processor is configured to decrease the driveforce curve only when the temperature is below a predetermined temperature threshold.

7. The system of claim 5 wherein the processor is configured to decrease the driveforce by a greater amount when the temperature is below a freezing temperature than when the temperature is above the freezing temperature.

8. The system of claim 3 wherein the weather detection unit includes a windshield wiper detection sensor and the weather data includes windshield wiper activation data, and the processor is configured to decrease the driveforce curve when the windshield wiper activation data indicates an activation of a windshield wiper.

9. The system of claim 8 wherein the processor is configured to decrease the driveforce curve by an amount based on a speed of the windshield wiper.

10. The system of claim 9 wherein the processor is configured to decrease the driveforce curve when the windshield wiper activation data indicates the activation of a windshield wiper for longer than a predetermined windshield wiper on time period.

11. An automobile comprising:
a weather detection unit having at least one sensor for detecting weather data;
an acceleration input device for detecting acceleration input data;
a speed sensor for detecting an automobile speed;
a driveforce unit for generating an output;
a memory for storing a driveforce map including a driveforce curve indicating the output of the driveforce unit for a corresponding acceleration input data; and
a processor connected to the weather detection unit, the acceleration input device, the driveforce unit, and the memory, the processor configured to analyze the weather data, and determine an adjustment to the driveforce curve based on the weather data, wherein the processor is configured to wait for the automobile speed to be below a predetermined speed before applying the adjustment to the driveforce curve.

12. The automobile of claim 11 wherein the weather detection unit includes a moisture detection sensor and the weather data includes moisture data, and the processor is configured to decrease the driveforce curve by an amount based on an amount of moisture and a type of moisture indicated by the moisture data.

13. The automobile of claim 12 wherein the weather detection unit further includes a temperature sensor and the weather data includes temperature data, and the processor is configured to decrease the driveforce curve by an amount based on a temperature indicated by the temperature data only when the temperature is below a predetermined temperature threshold.

14. The automobile of claim 11 wherein the weather detection unit includes a windshield wiper detection sensor and the weather data includes windshield wiper activation data indicating a speed of the windshield wiper, and the processor is configured to decrease the driveforce curve by an amount based on the speed of the windshield wiper.

15. The automobile of claim 11 wherein the processor is configured to decrease the driveforce curve when the windshield wiper activation data indicates an activation of the windshield wiper for longer than a predetermined windshield wiper on time period.

16. A method for varying an amount of driveforce comprising a processor connected to a driveforce unit and an acceleration input device having an active state and an idle state, the processor configured to perform the steps of:
determining weather data;
analyzing the weather data;
storing a driveforce map;
waiting for the acceleration input device to be in an idle state before adjusting the driveforce map;
adjusting the driveforce map based on the weather data; and
adjusting a driveforce curve in the driveforce map by an amount based on the weather data.

17. The method of claim 16 further comprising
detecting acceleration input data from the acceleration input device, wherein the driveforce map indicates a driveforce corresponding to the acceleration input data.

18. The method of claim 16 further comprising
decreasing the driveforce curve by an amount based on an amount of moisture and a type of moisture indicated by the weather data.

19. The method of claim 16 further comprising
decreasing the driveforce curve by an amount based on a temperature indicated by the weather data only when the temperature is below a predetermined temperature threshold.

20. The method of claim 16 further comprising
decreasing the driveforce curve by an amount based on a speed of a windshield wiper indicated by the weather data.

* * * * *